(12) United States Patent
Bonner et al.

(10) Patent No.: US 6,715,627 B1
(45) Date of Patent: Apr. 6, 2004

(54) WORK BUCKET VERTICAL EXTENSION APPARATUS

(76) Inventors: James D. Bonner, 2605 Wright Rd., Akron, OH (US) 44320; Kevin B. Smith, 2605 Wright Rd., Akron, OH (US) 44320

( * ) Notice: Subject to any disclaimer, the term of this patent is extended or adjusted under 35 U.S.C. 154(b) by 0 days.

(21) Appl. No.: 09/676,596

(22) Filed: Sep. 29, 2000

(51) Int. Cl.[7] .............................................. B65D 85/00
(52) U.S. Cl. ................ 220/4.27; 220/23.87; 220/23.89; 280/79.5; 280/79.11
(58) Field of Search ...................... 220/23.89, 23.87, 220/4.07, 4.26, 4.27; 200/506, 507; 280/79.5, 79.11

(56) References Cited

U.S. PATENT DOCUMENTS

| | | | | |
|---|---|---|---|---|
| 1,015,455 A | * | 1/1912 | Neesham | 220/23.89 |
| 1,214,992 A | * | 2/1917 | Boleratz | 220/23.89 |
| 2,257,569 A | * | 9/1941 | McCarthy | 220/23.89 |
| 2,716,939 A | * | 9/1955 | Smith | 220/23.89 |
| 3,230,573 A | * | 1/1966 | Hilberg | 220/23.89 |
| 4,574,969 A | | 3/1986 | Mays | |
| 5,494,163 A | * | 2/1996 | Apps | 206/506 |
| 5,605,242 A | * | 2/1997 | Hwang | 220/4.03 |
| 5,772,033 A | * | 6/1998 | Loftus et al. | 206/506 |
| 6,135,467 A | | 10/2000 | Tagariello | |

* cited by examiner

*Primary Examiner*—Joseph Man-Fu Moy
(74) *Attorney, Agent, or Firm*—John D. Gugliotta

(57) ABSTRACT

A work bucket vertical extension apparatus provides a lower pedestal bucket, an upper, elevated bucket vertically aligned into a nested position above the lower pedestal bucket, an da a sliding track mechanism such that the internal volume of the upper bucket is sufficient to receive the upper, elevated bucket when nested.

24 Claims, 5 Drawing Sheets

WORK BUCKET VERTICAL EXTENSION APPARATUS

RELATED APPLICATIONS

The present invention was first described in Disclosure Document No. 470,980, filed on Mar. 17, 2000. There are no previously filed, nor currently any co-pending applications, anywhere in the world.

BACKGROUND OF THE INVENTION

1. Field of the Invention

The present invention relates generally to include nested receptacles and, more particularly, to a nestable bucket extension.

2. Description of the Related Art

There are a great deal of cleaning tasks that are performed with a bucket of water. These tasks range from the cleaning of small spills, to window washing, to the washing of automobiles and large trucks. A common trait with all of these cleaning tasks is the requirement of the user to bend over to reach the bucket while rinsing sponges, rags and the like. This repeated bending over places strains on the user's back muscles. Also, when the bucket requires moving such as when moving to the next window or the other side of the car, the user is forced to lift the bucket and carry it. This action once again places stress and strain on not only the user's back muscles but their leg and arm muscles as well.

A search of the prior art did not disclose any patents that read directly on the claims of the instant invention; however, the following references were considered related.

The following patents disclose a multi-purpose fishing bucket with a nesting member.

U.S. Pat. No. 5,970,651 issued in the name of Torkilsen et al.

U.S. Pat. No. 5,319,877 issued in the name of Hagan

U.S. Pat. No. 4,759,148 issued in the name of Love

U.S. Pat. No. 5,573,367 issued in the name of Erickson et al. describes a nestable container for hauling materials.

U.S. Pat. No. 5,456,357 issued in the name of Wenner et al. discloses a nestable bucket and caddy.

U.S. Pat. No. 5,199,571 issued in the name of Wolff et al. describes a nestable bucket having lockable bails.

U.S. Pat. No. 4,040,460 issued in the name of Thornton discloses a collapsible bucket with telescopic erecting members.

U.S. Pat. No. Des. 355,735 issued in the name of Shaffer et al. describes the ornamental design for a combined bucket with nested containers and lid therefor.

Consequently, a need has been felt for providing an by which various cleaning tasks which require a bucket of water can be performed with reduced stress on users' back, leg and arm muscles.

SUMMARY OF THE INVENTION

Therefore, it is an object of the invention to provide for nestable bucket extension for aiding a user in various cleaning tasks which require a bucket of water can be performed with reduced stress on users' back, leg and arm muscles.

Briefly described according to one embodiment of the present invention, the present invention is an apparatus that provides for an elevated container to hold water and/or other cleaning compounds. It is designed to reduce the amount of bending over a user must do when washing cars, windows and the like. The primary components of the invention are two buckets, approximately five gallons in size, which are placed inside of one another and interconnected by two sliding tracks. This allows the inner bucket to be raised and locked into an elevated position. The lower bucket has a series of holes placed in its lower surface to prevent the accumulation of splashed water. A set of four casters, one of which is lockable, forms a base which allows the invention to be easily moved around and also to help from rolling away on any inclined surfaces. A small insert, suitable for smaller cleaning jobs, is placed inside the upper bucket.

The use of the present invention allows people who wash cars, clean windows or perform other cleaning tasks which require a bucket of water, the ability to perform such tasks in a manner which does not require repeated bending over to reach the bucket and the ability to move the bucket easily without lifting it.

Advantages of the present invention result in an elevated bucket for cleaning, allowing for raising of the bucket of water while washing cars, cleaning windows and the like, thereby eliminating bending over, reducing back strain and avoiding possible back injury.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
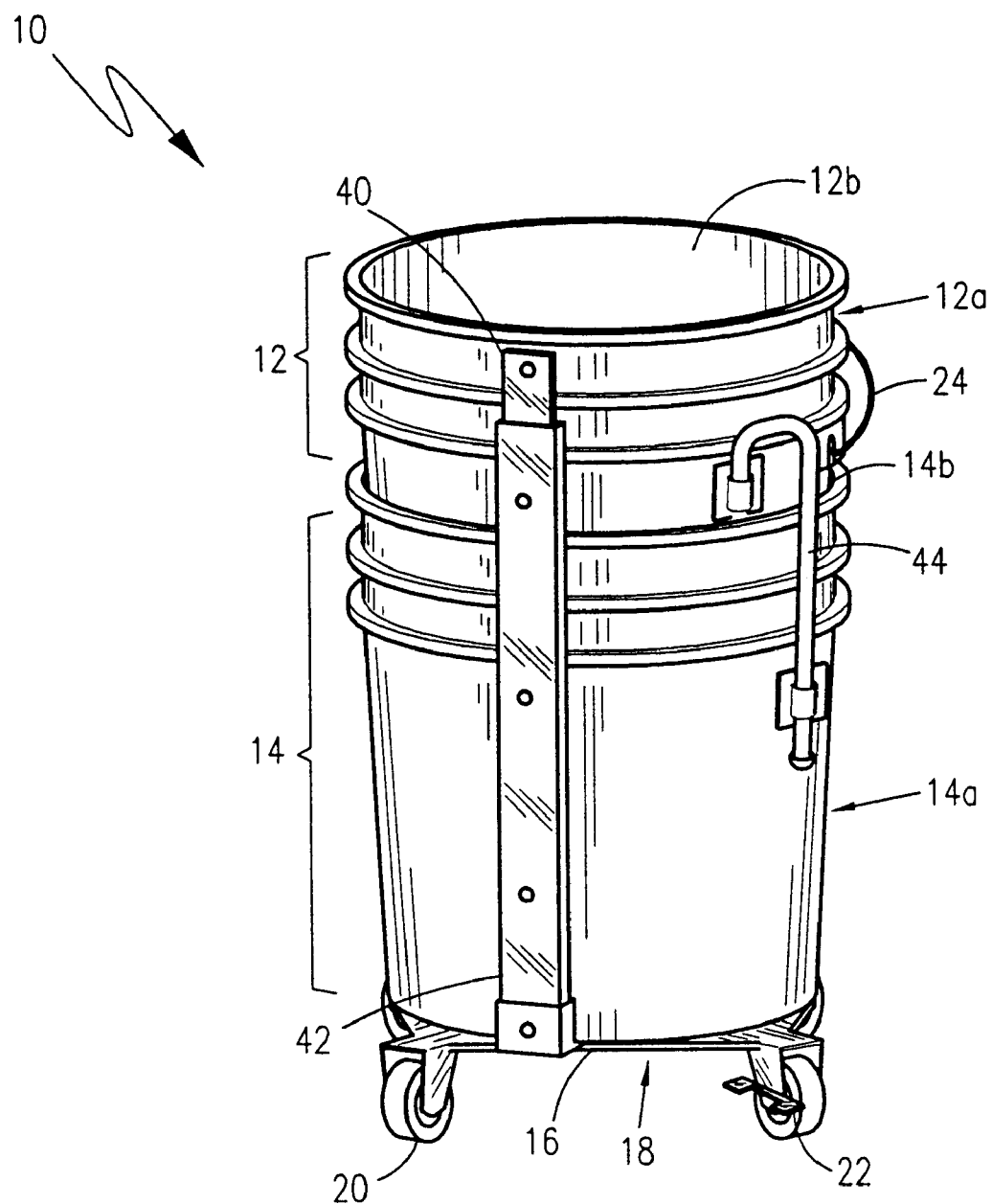
FIG. 1 is a perspective view of a work bucket vertical extension apparatus according to the preferred embodiment of the present invention shown in a nested, retracted condition.
Figure 2:
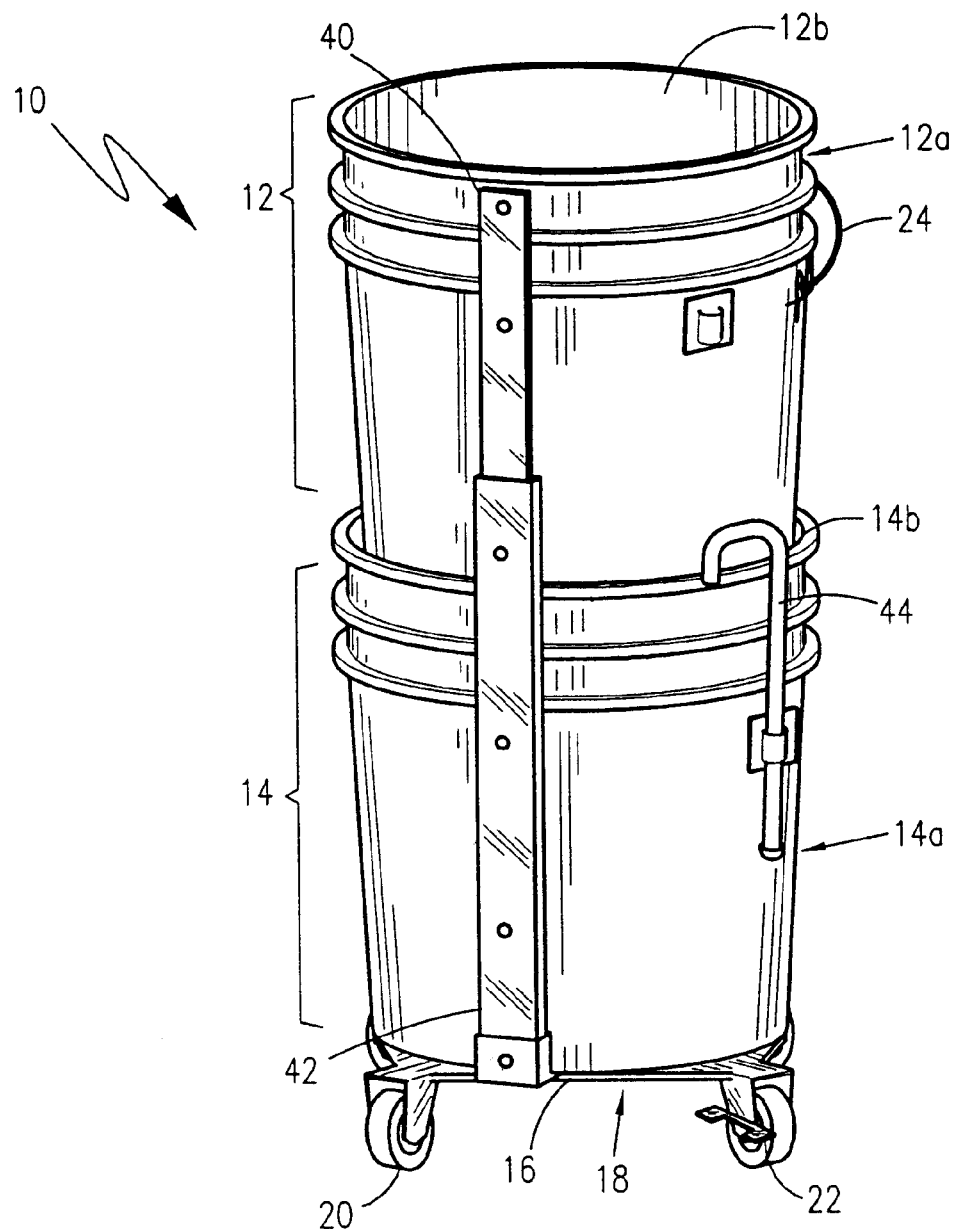
FIG. 2 is a perspective view thereof shown in an extended condition.
Figure 3:
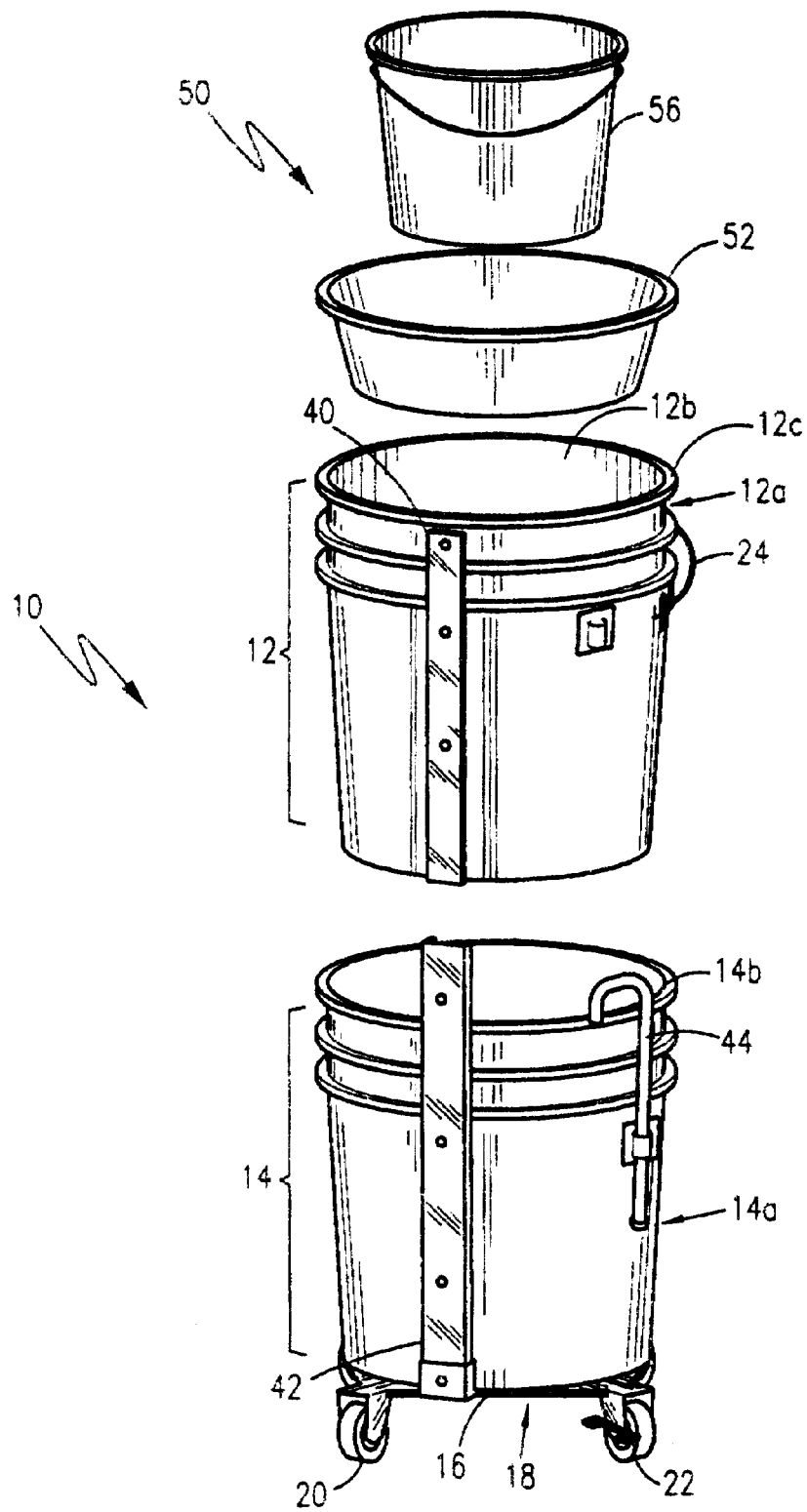
FIG. 3 is an exploded front perspective view thereof.

Referring now to FIGS. 1–3, a work bucket vertical extension apparatus 10 is shown, according to the present invention, an upper, elevated bucket 12 is provided in a vertically aligned, nested position to a lower pedestal bucket 14. As anticipated in its best commercial mode, it is felt that both the buckets 12, 14 would be configured as a conventionally available, plastic 5-gallon commercial contractors bucket or the like. Such buckets are readily available, economical, and have obtained an empirical functionality among the consumer and commercial marketplace. The lower pedestal bucket 14 has at its lowermost surface a radially, horizontally extended support base 16 in order to provide lateral support for the apparatus 10 when in use. Although many methods of such an extended support base 16 are anticipated, it is felt that for purposes of disclosing the best mode of the present invention one of two methods are preferred. First, it is felt that forming the extended support base 16 integrally within the bottom of the lower pedestal bucket 14 could provide sufficient functionality while providing for fewer assembled components for a commercial embodiment. Second, a separable support base 16 for frictionally impinging with or mechanically fastening to the lowermost end of the lower pedestal bucket 14 would also provide horizontal support sufficient to obstruct the apparatus 10 from easily tipping over when in use. In either instance, the support base 16 has a flat bottom surface 18 that supports a plurality of castor wheels 20, allowing the apparatus 10 to easily be rolled about during use when weighted. Additionally, at least one castor locking means 22 is anticipated to selectively prevent the apparatus 10 from being rolled about during use when weighted.

In its best mode the lower pedestal bucket 14 is formed as a generally cylindrical outer sidewall 14a forming an internal volume 14b. The internal volume 14b is sufficient to receive the upper, elevated bucket 12. Affixed to the outer sidewall 14a are a lower sliding track 42 portion of a sliding track mechanism 40 as will be described in greater detail in conjunction with FIG. 4. Further, affixed to the outer sidewall 14a is a bucket locking mechanism 44 as will be described in greater detail below.

The upper, elevated bucket 12 is formed as a generally cylindrical outer sidewall 12a forming an internal volume 12b. The internal volume 12b is sufficient to receive, hold, store, and dispense the liquid (or solid) contents required by the user. Affixed to the outer sidewall 12a are upper sliding track 44 portion of a sliding track mechanism 40 as will be described in greater detail in conjunction with FIG. 4. Further, affixed to the outer sidewall 12a is a bucket locking mechanism 44 for use in conjunction with the locking mechanism affixed to the lower bucket outer sidewall 14a as will be described in greater detail below. A pivoting handle 24 is affixed to the upper portion of the upper, elevated bucket 12, affixed at each end pivotally about the cylindrical upper rim 12c and spanning the upper opening thereof.

Figure 4:
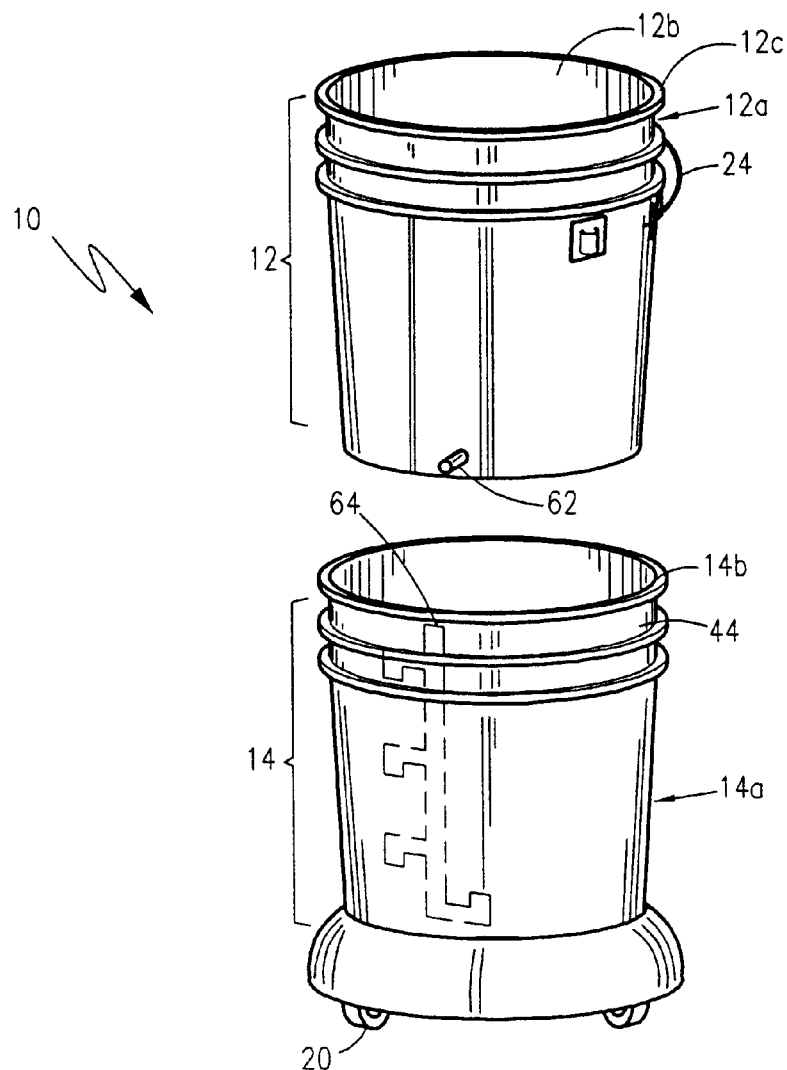
FIG. 4 is a side elevational detail view of a sliding track 40 for use therewith.

Referring now to FIG. 4, a sliding track mechanism 40 is shown in greater detail. The upper bucket 12 is designed and anticipated for use as an otherwise conventional bucket; the lower bucket 14 is designed to receive the upper bucket 12 in a nesting fashion, and at the same time function as a rollable, support base. The sliding track mechanism 40 is for providing a linear extension of the upper bucket 12 in relation to the lower bucket 14. The lower sliding track 42 portion of the sliding track mechanism 40 functions as a linear track guide, as well as a level gauge for securing the upper bucket 12 at one of a variety of predetermined positions. The upper sliding tracks 44 portion of the sliding track mechanism 40 functions as a guide, as well as a locking means for securing the upper bucket 12 into the predetermined position. Although one skilled in the relevant art would be capable of a variety of adaptations based upon the present teachings, one such version is shown wherein the lower sliding track 42 is formed as a main vertical channel 46 extending a majority of the vertical height of the lower bucket 14. The main vertical channel 42 intersects with a variety of horizontal level tracks 48. Extending radially outward from the upper sliding track 44 are a number of guide pins 50 for engaging with and traveling along the vertical channel 42. A lower horizontal level track 49 is placed at the vertical height corresponding with a fully nested position, and allows for the upper bucket 12 to be locked into position with the lower bucket 14 to allow the buckets to be picked up together.

Finally, a bucket locking mechanism 44 is anticipated for providing additional structural rigidity when the upper bucket 12 is positioned in a vertically extended position relative to the lower bucket 14. Although one skilled in the relevant art would be capable of a variety of adaptations based upon the present teachings, one such version incorporates an inverted L-hook 44a is pivotally affixed to and extends upward from the lower bucket outer sidewall 14a. A hook receiving keyhole 44b is affixed to the upper bucket sidewall 12a for receiving the upper hook element of the L-hook 44a. By affixing the hook 44a into the receiving keyhole 44b, the buckets 12,14 can be locked together in a supportive fashion.

Figure 5:
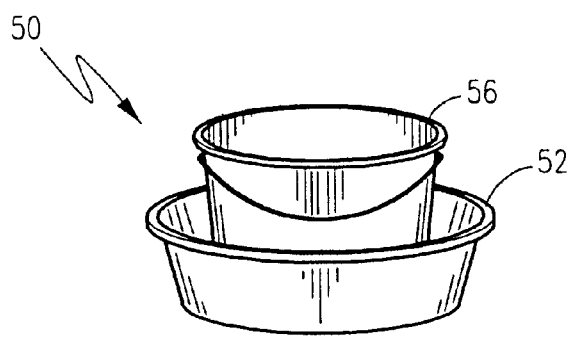
FIG. 5 is a partial perspective view of a removable small bowl insert for use therewith.

Referring finally to FIG. 5, a partial perspective view of a removable small bowl insert 50 is shown having an insert sleeve 52 designed to fit within the upper opening orifice of the upper bucket 12. The bottom of the bowl insert 50 can be perforated, allowing drainage into the receiving cavity of the upper bucket 12. A concave bowl element 54 is affixed to the top of the bowl insert 50, and pivoting handle 56 is affixed to the upper portion of the bowl 54, affixed at each end pivotally about the upper rim and spanning the upper opening thereof.

Figure 6:
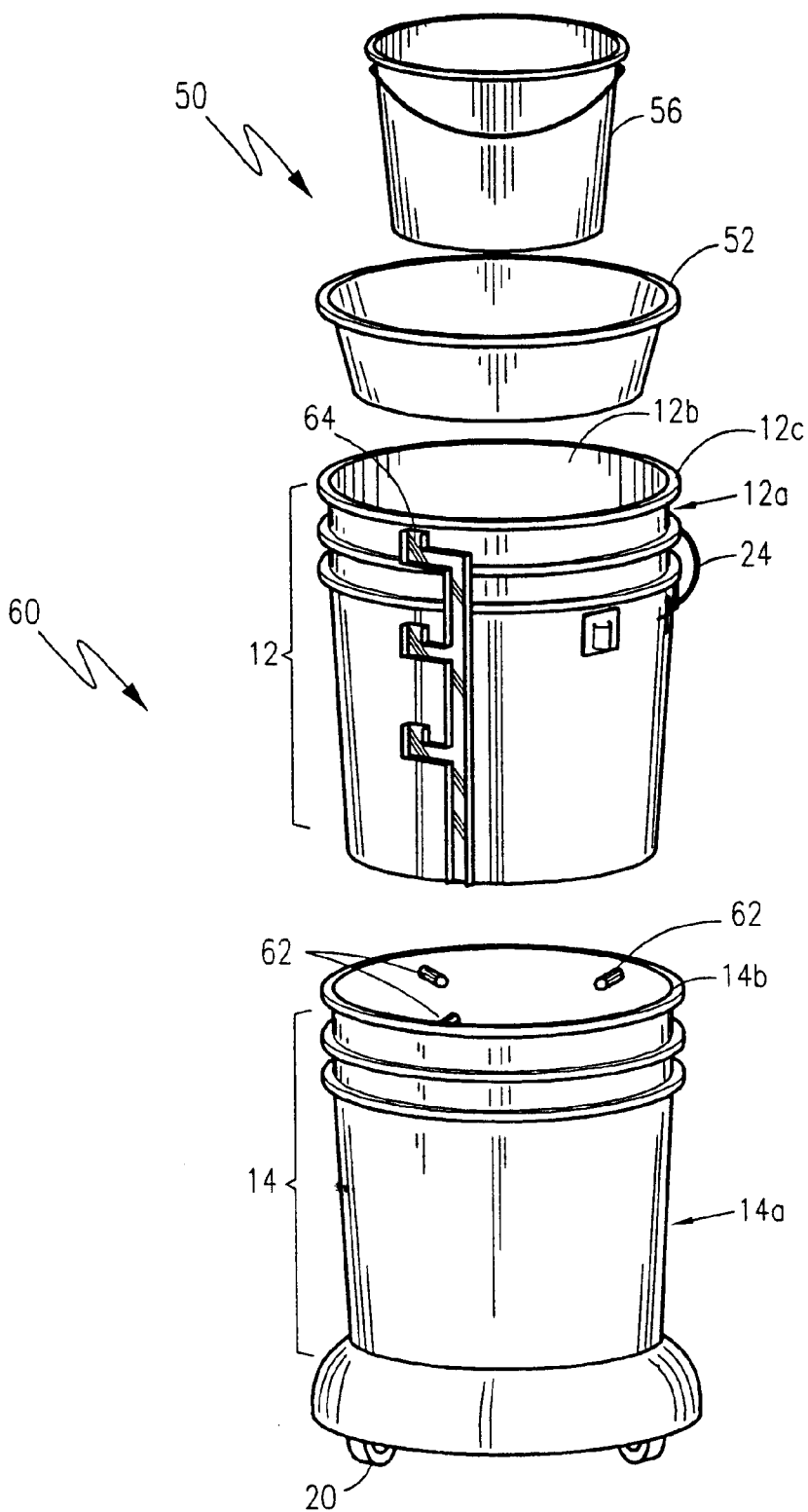
FIG. 6 is an exploded front perspective view of a work bucket vertical extension apparatus according to a first alternate embodiment.

Referring now to FIG. 6, a first alternate embodiment for a work bucket vertical extension apparatus 10 is shown. An upper, elevated bucket 12 is provided in a vertically aligned, nested position to a lower pedestal bucket 14. The lower pedestal bucket 14 has at its lowermost surface a radially, horizontally extended support base 16 in order to provide lateral support for the apparatus 10 when in use. Although many methods of such an extended support base 16 are anticipated, it is felt that for purposes of disclosing the best mode of the present invention one of two methods are preferred. First, it is felt that forming the extended support base 16 integrally within the bottom of the lower pedestal bucket 14 could provide sufficient functionality while providing for fewer assembled components for a commercial embodiment. Second, a separable support base 16 for frictionally impinging with or mechanically fastening to the lowermost end of the lower pedestal bucket 14 would also provide horizontal support sufficient to obstruct the apparatus 10 from easily tipping over when in use. In either instance, the support base 16 has a flat bottom surface 18 that supports a plurality of castor wheels 20, allowing the apparatus 10 to easily be rolled about during use when weighted. Additionally, at least one castor locking means 22 is anticipated to selectively prevent the apparatus 10 from being rolled about during use when weighted. The lower pedestal bucket 14 is formed as a generally cylindrical outer sidewall 14a forming an internal volume 14b. The internal volume 14b is sufficient to receive the upper, elevated bucket 12. Affixed to the innermost portion of the sidewall 14a are guide pins 62 protruding inward for penetrating into a sliding track guide channel 64 formed in the outer sidewall of the upper bucket as described below.

The upper, elevated bucket 12 is formed as a generally cylindrical outer sidewall 12a forming an internal volume 12b. The internal volume 12b is sufficient to receive, hold, store, and dispense the liquid (or solid) contents required by the user. Formed into the outer sidewall 12a are sliding track guide channel 64 for receiving the guide pin 62 as described above. The track guide channel 64 is configured with a vertical channel for allowing the upper bucket 12 to raise or lower relative to the lower bucket 14. However, a various predetermined heights, additional locking channels extend horizonally to form a retaining ridge against which the guide pin 62 impinges in order to hold the upper bucket 12 at the predetermined level.

A second alternate embodiment is similar in configuration to that shown in FIG. 6; however, the guide pin 72 is formed extending outward from the sidewall of the upper bucket 12 (rather than the inner sidewall of the lower bucket). Similarly, formed into the inner sidewall of the lower bucket 14 is sliding track guide channel 74 for receiving the guide pin 72.

2. Operation of the Preferred Embodiment

To use the present invention The use of the present invention allows people who wash cars, clean windows or perform other cleaning tasks which require a bucket of water, the ability to perform such tasks in a manner which does not require repeated bending over to reach the bucket and the ability to move the bucket easily without lifting it. Such use results in an elevated bucket for cleaning, allowing for raising of the bucket of water while washing cars, cleaning windows and the like, thereby eliminating bending over, reducing back strain and avoiding possible back injury.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. An apparatus comprising:
    a base, said base comprising a flat bottom surface;
    a lower liquid-holding container supported by said base;
    an upper liquid-holding container nested within said lower container and supported by said base and said lower container, said upper container selectively movable to and retainable in at least first and second elevations relative to said lower container, said first elevation being less than said second elevation, said second elevation vertically projected from said lower container; and,
    a plurality of wheels connected to said base, said wheels movably supporting said base on a support surface; and
    at least one sliding track interconnecting said base and said container, wherein a first component of said at least one sliding track is connected to said container and a second component of said at least one sliding track is connected to said base.

2. The apparatus as set forth in claim 1, wherein said container moves relative to said base between said first and second elevations along a vertical axis.

3. The apparatus as set forth in claim 1, wherein at least one of said plurality of wheels locks to inhibit movement of said base on said support surface.

4. The apparatus as set forth in claim 1, wherein said base and said container are defined from a molded plastic material.

5. The apparatus as set forth in claim 1, wherein said container is slidably engaged with said base.

6. The apparatus as set forth in claim 1, wherein said container is selectively separable from said base.

7. The apparatus as set forth in claim 1, wherein said container is a bucket.

8. An apparatus comprising:
    a base, said base comprising a flat bottom surface;
    a plurality of wheels connected to said base, said wheels movably supporting said base above a floor surface;
    a pair of containers, said pair of containers comprising an upper container nestable within a lower container; and,
    means for supporting said container on said base in at least two different elevations relative to said base, said base and container movable as a unit on said floor surface when said container is located in all of said at least two different elevations relative to said base, wherein said means for supporting said container comprises at least one a sliding track slidably interconnecting said container and said base.

9. A work bucket vertical extension apparatus comprising:
    a lower pedestal bucket formed as a generally cylindrical inner sidewall forming an internal volume;
    a base extending outwardly relative to said lower pedestal bucket;
    a plurality of wheels connected to said base and movably supporting said base above a floor surface;
    an upper, elevated bucket formed as a generally cylindrical outer sidewall forming a storage volume, said upper bucket located within said internal volume defined by said lower bucket in a vertically aligned, nested position relative to said lower pedestal bucket;
    a sliding track mechanism having a lower sliding track portion affixed to said inner sidewall of said lower pedestal bucket and an upper sliding track portion affixed to said outer sidewall of said upper, elevated bucket, said upper bucket selectively movable to and retained in multiple different elevated positions relative to said lower bucket, said upper bucket extending outwardly above an open upper edge of said lower bucket in each of said multiple different elevated positions;
    said base, lower bucket and upper bucket movable as a unit on said plurality of wheels relative to said floor surface when said upper bucket is located in any one of said multiple different elevated positions.

10. The work bucket vertical extension apparatus of claim 9, wherein said lower pedestal bucket has at a lowermost surface a radially, horizontally extended support base in order to provide lateral support when in use.

11. The work bucket vertical extension apparatus as set forth in claim 9, wherein said base is formed integrally with the lower pedestal bucket.

12. The work bucket vertical extension apparatus as set forth in claim 9, wherein said base is selectively and removably mechanically fastened to a lowermost end off said lower pedestal bucket.

13. The work bucket vertical extension apparatus of claim 11, wherein said support base forms a flat bottom surface that supports a plurality of castor wheels.

14. The work bucket vertical extension apparatus of claim 12, wherein said support base forms a flat bottom surface that supports a plurality of castor wheels.

15. The work bucket vertical extension apparatus as set forth in claim 9, further comprising means for selectively locking at least one of said plurality of wheels to prevent unintended movement of said base on said floor.

16. The work bucket vertical extension apparatus of claim 14, further comprising at least one castor locking means.

17. The work bucket vertical extension apparatus of claim 9, further comprising a bucket locking mechanism for locking said sliding track mechanism into a fixed position.

18. The work bucket vertical extension apparatus of claim 9, further comprising a pivoting handle affixed to an upper portion of said upper, elevated bucket and spanning the upper opening thereof.

19. The work bucket vertical extension apparatus of claim 9, wherein said sliding track mechanism provides for a linear extension of said upper bucket in relation to said lower bucket, and wherein said lower sliding track portion functions as a linear track guide, as well as a level gauge for securing said upper bucket at a predetermined positions, and wherein further said upper sliding tracks portion of functions as a guide, as well as a locking means for securing said upper bucket into said same predetermined position.

20. The work bucket vertical extension apparatus as set forth in claim 9, wherein said lower sliding track is formed as a main vertical channel extending a majority of a vertical height of said lower bucket, and wherein said main vertical channel intersects with a variety of horizontal level tracks.

21. The work bucket vertical extension apparatus of claim 20, wherein extending radially outward from said upper sliding track are a equal number of guide pins for engaging with and traveling along said vertical channel.

22. The work bucket vertical extension apparatus of claim 21, further comprising a lower horizontal level track placed at the vertical height corresponding with a fully nested position, and allows for the upper bucket to be locked into position with the lower bucket to allow the buckets to be picked up together.

23. The work bucket vertical extension apparatus of claim 17, wherein said bucket locking mechanism comprises an inverted L-hook pivotally affixed to and extending upward from said lower bucket outer sidewall; and a hook receiving keyhole affixed to said upper bucket sidewall for receiving an upper hook element of said L-hook.

24. The work bucket vertical extension apparatus as set forth in claim 1, further comprising a removable liquid-container insert removably connected to said upper bucket within an open upper end of said upper bucket.

\* \* \* \* \*